United States Patent
Holmes

(10) Patent No.: US 6,490,635 B1
(45) Date of Patent: Dec. 3, 2002

(54) CONFLICT DETECTION FOR QUEUED COMMAND HANDLING IN DISK DRIVE CONTROLLER

(75) Inventor: Richard M. Holmes, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/561,228

(22) Filed: Apr. 28, 2000

(51) Int. Cl.[7] .......................... G06F 13/00; G06F 13/18; G06F 12/00
(52) U.S. Cl. .............................. 710/3; 710/5; 710/15; 710/18; 710/24; 710/38; 710/39; 711/210
(58) Field of Search ........................... 710/5, 3, 15, 18, 710/24, 38, 39; 711/210

(56) References Cited

U.S. PATENT DOCUMENTS

| | | | | |
|---|---|---|---|---|
| 4,627,017 A | * | 12/1986 | Blount et al. | 711/212 |
| 5,548,795 A | * | 8/1996 | Au | 710/3 |
| 5,832,304 A | * | 11/1998 | Bauman et al. | 710/39 |
| 5,870,580 A | * | 2/1999 | Walker | 712/218 |
| 6,094,713 A | * | 7/2000 | Khadder et al. | 711/210 |
| 6,288,730 B1 | * | 9/2001 | Duluk et al. | 345/428 |

* cited by examiner

Primary Examiner—Jeffrey Gaffin
Assistant Examiner—Rehana Perveen
(74) Attorney, Agent, or Firm—Milad G. Shara, Esq.; Glenn R. Smith, Esq.

(57) ABSTRACT

A conflict detection method for a disk drive controller is used to handle a conflict potentially occurring if the execution sequence of queued commands sent from a host to a controller is reordered to optimize disk drive transfers. The conflict detection method determines if there is an address range overlap between two queued commands. If an overlap exists, a conflict flag is set. The controller microprocessor utilizes this flag to restrict command reordering and prevent a conflict from producing erroneous data. Conflict detection and command reordering restriction are facilitated by a queued command RAM and a command FIFO. The queued command RAM stores command parameters indexed by command tag values. These parameters include command direction (read or write), LBA, block count, a valid flag and a conflict flag. The conflict detection method compares the address range of a new command with the address range of valid commands in the command RAM to determine range overlaps. If an overlap exists with a new write command, the conflict flag is set for both the write command and the overlapping commands in the queued command RAM. The microprocessor accesses the queued command RAM to determine which chronologically ordered commands in the FIFO must be executed in sequence.

8 Claims, 7 Drawing Sheets

| REGISTER | 7 | 6 | 5 | 4 | 3 | 2 | 1 | 0 |
|---|---|---|---|---|---|---|---|---|
| FEATURES | BLOCK COUNT | | | | | | | |
| SECTOR COUNT | TAG | | | | | NA | NA | NA |
| SECTOR NUMBER | LBA (7:0) | | | | | | | |
| CYLINDER LOW | LBA (15:8) | | | | | | | |
| CYLINDER HIGH | LBA (23:16) | | | | | | | |
| DEVICE/ HEAD | OBS | 1 | OBS | DEV | LBA (27:24) | | | |
| COMMAND | DEVICE COMMAND | | | | | | | |

FIG. 2 (Prior Art)

CONFLICT DETECTION FOR QUEUED COMMAND HANDLING IN DISK DRIVE CONTROLLER

FIELD OF THE INVENTION

The present invention relates to a disk drive controller that provides for the handling of queued commands from a host device and in particular to a method for detecting a command conflict that would restrict reordering of queued commands.

BACKGROUND OF THE INVENTION

FIG. 1 illustrates a conventional interface 100 for exchanging data between a hard disk drive 120 and a host 110. The host 110 is typically a computer such as a personal computer, server or workstation. The disk drive 120 typically provides mass data storage for the computer. The disk drive 120 comprises a head disk assembly (HDA) 130 and an integrated controller 140. The head disk assembly 130 includes one or more storage disks 132. The controller 140 is hardware and associated firmware that interfaces to the host 110 and controls the transfer of data between the disk drive and the controller's data buffer or cache (not shown). The host 110 and disk drive 120 are connected by a bus 112, which provides a standard physical and data link layer between the host 110 and controller 140. Associated protocols provide a standard communications link layer between the host 110 and controller 140. The most common standards for these physical, data and communications layers of the host-controller interface 100 are SCSI and ATA. One ATA standard, described in ANSI document number NCITS 317-1998 entitled "AT Attachment with Packet Interface Extension (ATA/ATAPI-4)," commonly known as ATA-4, defines a protocol for queued host commands.

Command queuing is an optional command scheme whereby the host 110 sends multiple tagged commands for processing by the controller 140. The tagged commands are stored in a command queue, to be executed sequentially. Potentially, these commands can be reordered by the controller's microprocessor into an optimal execution sequence for enhanced disk drive performance, as described below. Command queuing also reduces interface bus overhead because the controller 140 can perform disk accesses while waiting for the next host command. Further, command queuing allows the controller 140 to release the interface bus 112 if command execution will be delayed.

Command reordering is a technique used with command queuing to mitigate the effects of seek time and rotational latency, the slowest aspects of disk drive data transfers. If the command order can be changed so that commands accessing data in areas closer to the head are given greater priority, then the performance of the drive improves. For example, if a first command received from the host requests data from an inner track, a second command requests data from an outer track and a third command requests data, also from an inner track, the head has to travel from the inner tracks to the outer tracks, and then back to the inner tracks to execute the commands in chronological order. Command reordering would efficiently execute the first and third commands sequentially.

FIG. 2 illustrates the taskfile register content for queued commands, as defined in the ATA-4 specification. The taskfile register 200 is a memory located on the controller 140 (FIG. 1) at specific host I/O addresses. The host writes to the taskfile register 200 to initiate commands, and the host reads the taskfile register to obtain data transfer status (not shown). For a queued read or write command, the taskfile register 200 contains a block count 210, a tag 220, a logical block address (LBA) 230 and a command code 240. The LBA 230 specifies the logical starting address on the storage disks 132 (FIG. 1) for a read or write. The block count 210 specifies the number of blocks of data to transfer between the storage disks 132 (FIG. 1) and the host 110 (FIG. 1). The tag 220 is a host designated command identifier, allowing the host 110 (FIG. 1) to determine which of several queued and possibly reordered commands was subsequently executed by the controller 140 (FIG. 1). The command code 240 is a unique bit pattern that specifies a particular host command.

A problem that arises with respect to queued commands and, in particular, with command reordering is that a conflict can exist when the address range of a write command overlaps with the range of a previously queued read or write command. FIG. 3A illustrates one such conflict between two write commands 310, 320. For example, assume a first queued write command 310 has an address range extending from 100 to 199, as shown. Assume a second queued write command 320 is received with an address range extending from 45 to 119, as shown. The host would assume that these commands 310, 320 are executed chronologically, with the overlapping data portion 322 of the second write command 320 overwriting the data portion 312 of the first write command 310 in the address range from 100 to 119. If the controller reorders these queued commands 310, 320, then the overlapping data portion 312 of the first write command 310 would, instead, overwrite the data portion 322 of the second write command 320. A subsequent disk read in the address range of 100 to 119 would return erroneous results to the host.

FIG. 3B illustrates a conflict between a queued read command 330 and a subsequent queued write command 340. For example, assume the queued read command 330 has an address range extending from 100 to 199, as shown. Assume the subsequent queued write command 340 has an address range extending from 170 to 244, as shown. The host would assume that these commands 330, 340 are executed chronologically, with the read command returning data from the address range 170 to 199 prior to being overwritten by the write command 340. If the controller reorders these queued commands 330, 340, then the overlapping data portion 342 of the write command 340 would, instead, overwrite the data portion 332 subsequently accessed by the read command 330, returning erroneous data to the host.

A read command overlapping with another read command is not a conflict, because correct data is returned to the host regardless of the order of execution of read commands. Further, a subsequent read command overlapping with a previous write command is not a conflict. The data for the queued write would be held in the controller's cache. If the read command is reordered to occur before the write command, the overlapping portion of the read command would be provided from the cache rather than from the storage disks. Thus, the data returned to the host from the overlapping portion of the read command would be the same regardless of the order of command execution.

SUMMARY OF THE INVENTION

One aspect of the present invention is a conflict detection method for a disk drive controller, such a conflict potentially occurring if the execution sequence of queued commands sent from a host is reordered to optimize disk drive data transfers. The conflict detection method comprises the steps of decoding a first command, where the first command is a queued read or a write, and reading an associated first logical block address (LBA) and first block count, where the first LBA and the first block count define a first address range. The method further comprises the steps of decoding a second command, where the second command is a write, and reading an associated second LBA and a second block count, where the second LBA and the second block count define a second address range. The method also comprises the steps of detecting an overlap between the first address range and the second address range and setting a conflict flag based on the overlap. In addition the method comprises the step of restricting command reordering based upon the flag in order to prevent the conflict from occurring.

In one embodiment, the conflict detection method described in the previous paragraph further comprises the steps of reading a tag value associated with the first command, creating an entry in random access memory (RAM) according to the tag value, and storing the first LBA and the first block count in the entry, wherein the setting step comprises the substep of storing a set bit in the entry corresponding to the conflict flag. The method may also comprise the steps of unloading the first command in chronological order from a first-in-first-out (FIFO) memory and reading the set bit from the RAM entry, wherein the restricting step comprises the substep of processing the first command before any subsequent commands in the FIFO. In another embodiment, the conflict detection method further comprises the steps of reading a tag value associated with the second command, creating an entry in random access memory (RAM) according to the tag value, and storing the second LBA and the second block count in the entry, wherein the setting step comprises the substep of storing the conflict flag in the entry. In yet another embodiment, the conflict detection method further comprises the steps of reading a tag value associated with the first command, creating an entry in random access memory (RAM) according to the tag value, and storing the first LBA and the first block count in the entry, wherein the detecting step comprises the substeps of reading the first LBA and the first block count from the entry and comparing the first LBA and the first block count with the second LBA and the second block count. In another embodiment, the conflict detection method further comprises the steps of reading a first tag value associated with the first command, creating an entry in random access memory (RAM) according to the tag value, the entry having a valid flag field. The method also comprises the steps of reading a second tag value associated with the second command, accessing the RAM according to the second tag value, and indicating an error if the accessing step reads the entry and the valid flag is set. In a further embodiment, the conflict detection method also comprises the step of clearing the conflict flag upon completion of the first command.

The invention can also be viewed as a disk drive controller for processing host commands, each having an address range, which are received in a first order from a host and queued for subsequent execution, wherein the queued commands can be executed in a second order for improved latency. The disk drive controller comprises a command queue memory for storing a first one and a second one of the received host commands which are queued for execution, the second one of the host commands being a write command. The controller further comprises a scan engine, for scanning the command queue memory to detect an overlap between the address range of the first command and the address range of the second command; a means, responsive to the scan engine scanning the command queue memory, for setting a conflict flag; and a means, responsive to the setting of the conflict flag, for modifying the second order of execution to avoid a conflict from the second command.

BRIEF DESCRIPTION OF THE DRAWINGS

FIG. 2 is a chart illustrating the contents of the taskfile register defined by the ATA-4 standard;

DETAILED DESCRIPTION OF THE PREFERRED EMBODIMENTS

Figure 4:
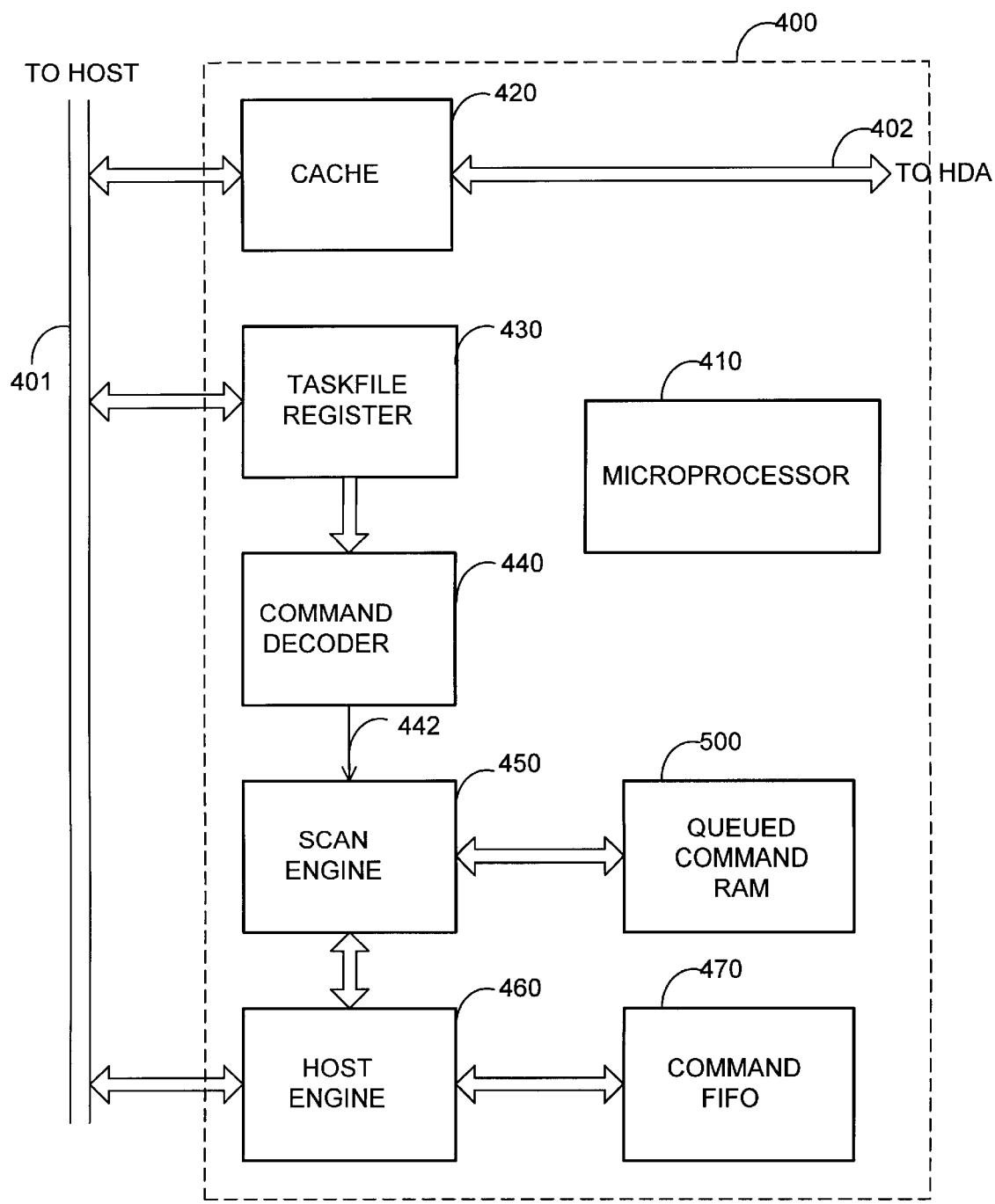
FIG. 4 is a block diagram of a controller for handling queued commands.

FIG. 4 illustrates a controller 400 for queued command handling according to a preferred embodiment of the invention. The controller 400 has a microprocessor 410, a data cache 420, a taskfile register 430, a command decoder 440, a scan engine 450, a host engine 460, a command FIFO 470 and a queued command RAM 500. The microprocessor 410 executes firmware instructions that carryout host commands and manage various controller functions. The cache 420 is semiconductor memory that temporarily stores read data from the storage disks to be transferred to the host and write data received from the host to be written to the storage disks. The taskfile register 430 is semiconductor memory configured to comply with an ATA interface standard such as ATA-4, as described with respect to FIG. 2, above. The command decoder 440 reads the command portion of the taskfile register 430 and generates a queued command signal 442 indicating that a received host command is a queued command. In response to the queued command signal 442, the scan engine 450 looks for address range overlaps between a newly received queued write command and other queued commands, as described with respect to FIG. 6B, below. If no duplicate tags are detected during the scan, the scan engine 450 loads the new command parameters (direction, LBA and count) into the queued command RAM 500, as described with respect to block 630 (FIG. 6A), below. The host engine 460 checks the collective conflict condition shortly after the scan, and if it is present, sets an interrupt to the microprocessor 410, as described with respect to block 642 (FIG. 6A), below. When a conflict is detected, the host engine 460 stops further processing, holds the ATA bus 401 busy, and expects the microprocessor 410 to do the necessary processing to clear the conflict. The host engine 460 also checks if an incoming command has generated a duplicate tag error and interrupts the microprocessor accordingly, as described with respect to block 616 (FIG. 6A), below. The command FIFO 470 is a semiconductor memory configured as a first-in, first-out buffer. The host engine 460 loads incoming commands into the command FIFO 470 in the order received, providing a means for the microprocessor 410 to later determine command chronological order.

Figure 5:
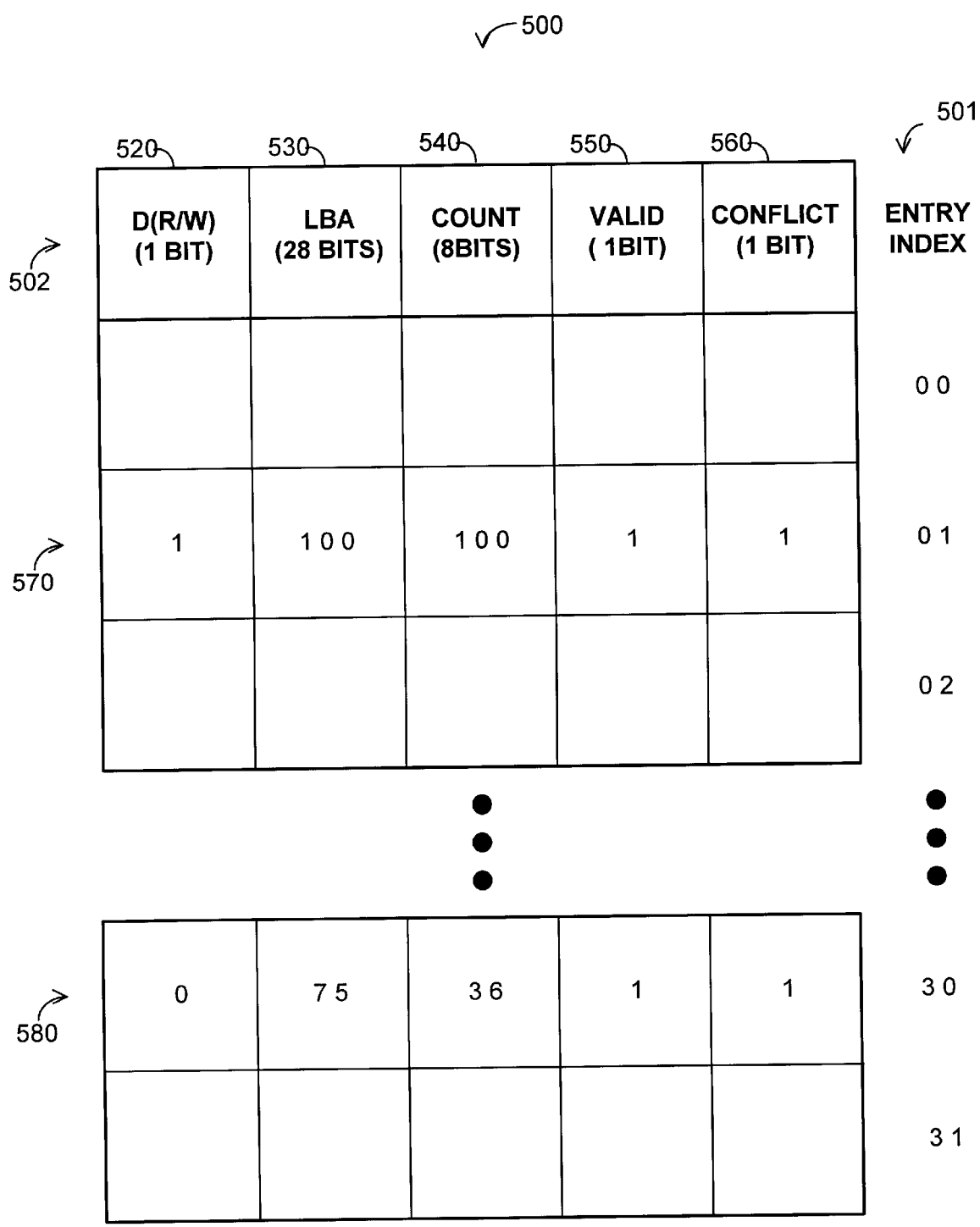
FIG. 5 is a diagram illustrating the queued command RAM portion of the controller according to FIG. 4.

FIG. 5 illustrates further detail regarding the queued command RAM 500, which is configured as a table of rows 501 and columns 502. The rows 501 provide entries for command parameters that are indexed by command tag values. Thirty-two rows are possible using the five-bit tag value 220 (FIG. 2) in the taskfile register 200 (FIG. 2). The columns 502 represent fields of command parameters including command direction 520, LBA 530, block count 540, valid flag 550 and conflict flag 560. The direction field 520 indicates a read or write command, as determined by the command decoder 440 (FIG. 4). The LBA 530 and block count 540 are read from the taskfile register 430 (FIG. 4). The valid flag 550 and conflict flag 560 are set according to the conflict detection method described with respect to FIGS. 6A–B, below. In particular, the valid flag 550 indicates that the tag value of the corresponding entry is valid, i.e. is associated with a pending command and cannot be reused until the pending command completes. A protocol violation occurs if the host sends a command with a tag value associated with a pending command. A duplicate tag error interrupt 616 (FIG. 6A) is sent to the microprocessor 410 as a result. The microprocessor 410, in turn, notifies the host 110 of the protocol violation. The conflict flag indicates a command conflict, such as described with respect to FIGS. 3A–B, above. If any conflict flags 560 are set in the queued command RAM 500, a conflict error interrupt is generated to the microprocessor 642 (FIG. 6A), restricting command reordering until all conflict flags 560 in the queued command RAM 500 are cleared. As each command is completed, the host engine 460 (FIG. 4) or microprocessor 410 (FIG. 4) clears the associated valid flag 550 and conflict flag 560.

The command parameters depicted in FIG. 5 are entered into the queued command RAM 500 according to the conflict detection method described with respect to FIGS. 6A–B, below. For example, the entry 570 at index value 01 has the valid flag set, indicating that a command having tag value 01 is pending. That command is a write of 100 blocks beginning at LBA 100. As another example, the entry 580 at index value 30 has the valid flag set, indicating that a command having tag value 30 is pending. That command is a read of 36 blocks beginning at LBA 75. The conflict flags are set for the write command entry 570 and the read command entry 580 to indicate that these commands overlap and cannot be reordered.

In reference to FIG. 4, the microprocessor 410 utilizes the queued command RAM 500 in conjunction with the command FIFO 470 for queued command handling. The conflict field 560 (FIG. 5) of the queued command RAM 500 contains flagged entries for all commands having an address overlap with an incoming queued write command, as described with respect to FIG. 6B, below. The queued command RAM 500 stores command parameters according to their tag values, which are not assigned in any particular order. The command FIFO 470, however, preserves the chronological command order, which provides the microprocessor 410 with the sequencing information necessary to handle queued command conflicts. Specifically, in response to a conflict error interrupt 642 (FIG. 6A) the microprocessor 410 unloads commands from the command FIFO 470, reading their associated tag values. Using these tag values, the microprocessor can read the corresponding conflict flags from the queued command RAM 500. If a conflict flag is clear, the microprocessor does not restrict reordering for the corresponding command. If the conflict flag is set, the microprocessor must process the corresponding command before any subsequent commands in the command FIFO 470, which restricts command reordering.

Figure 6A:
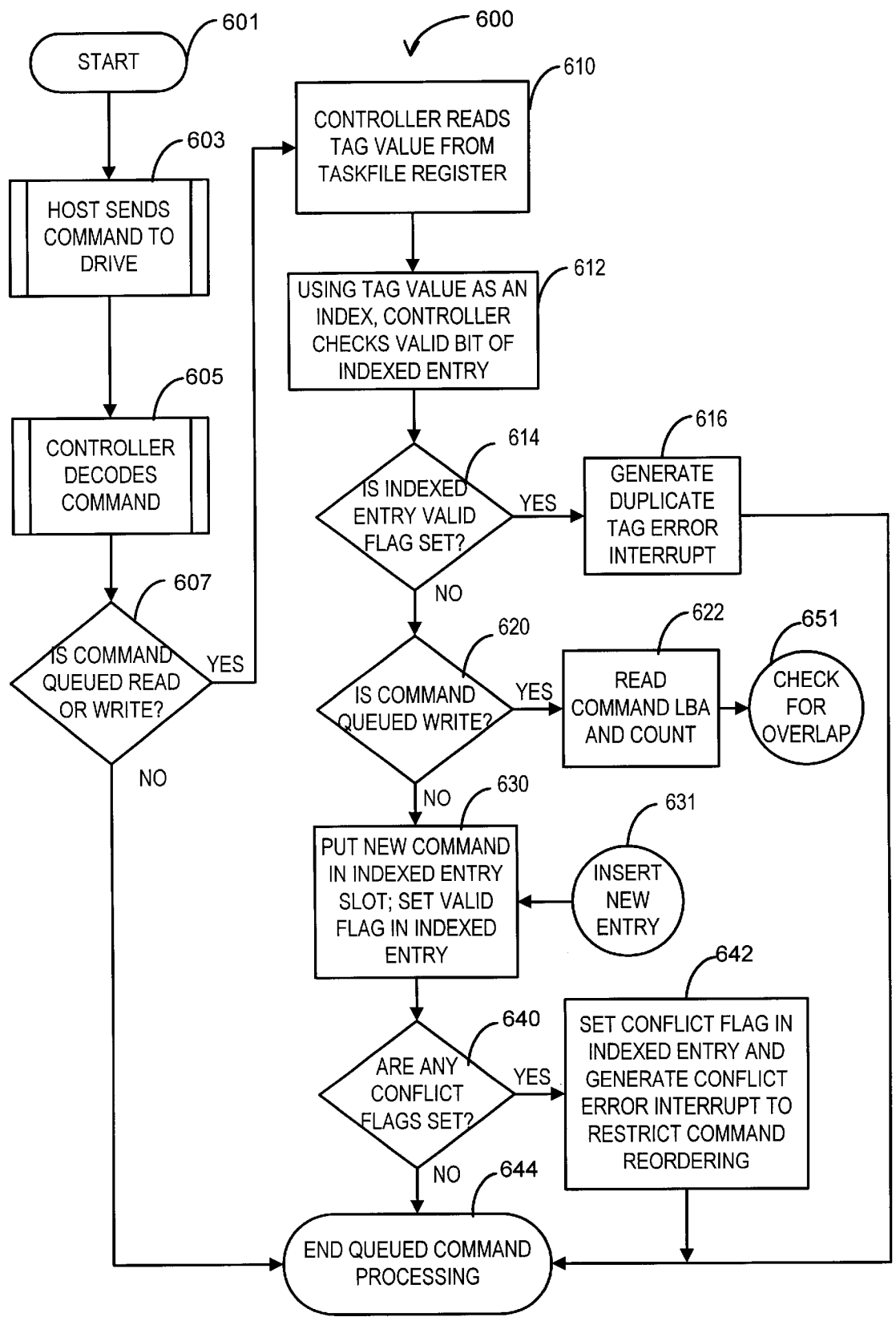
FIGS. 6A–B are a flowchart illustrating a method of queued command conflict detection according to the present invention.
Figure 6B:
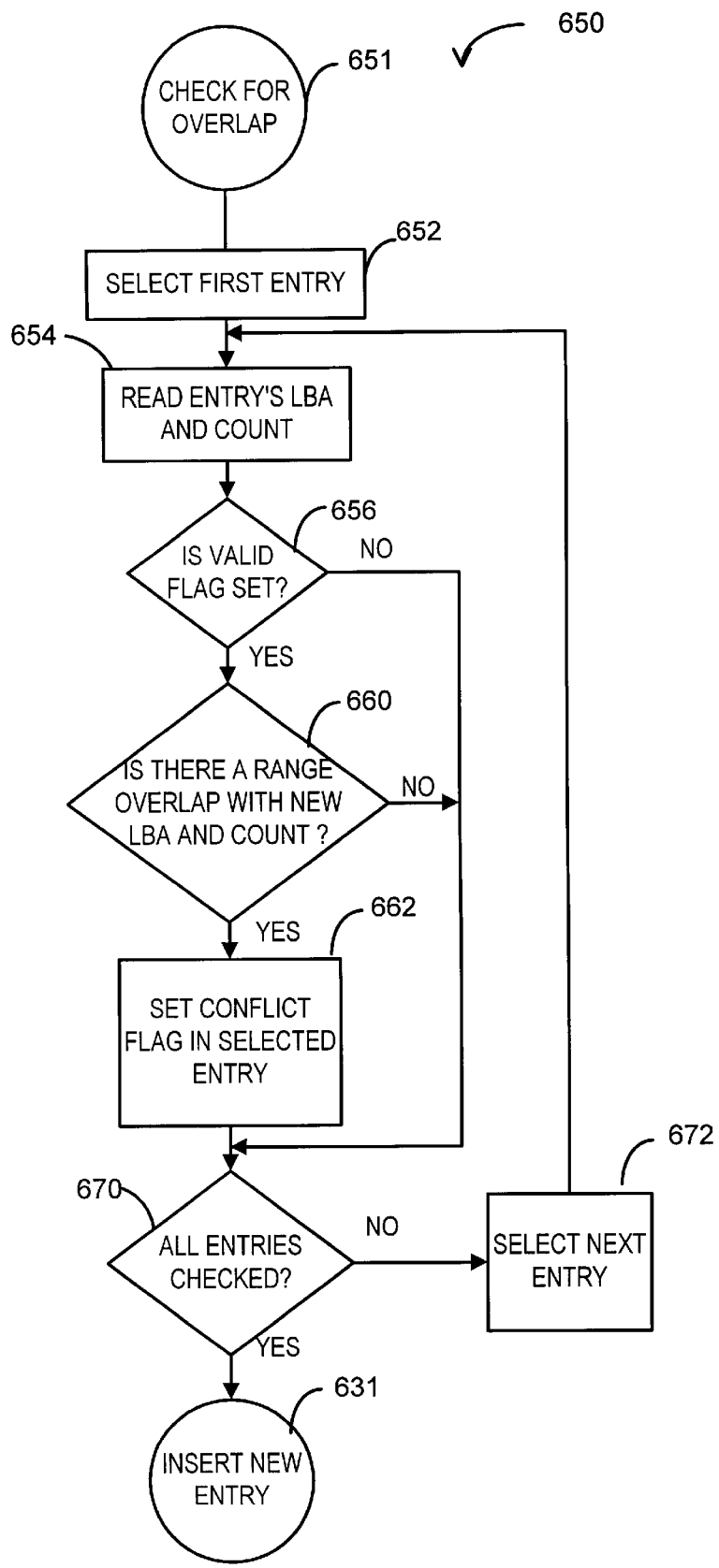

FIGS. 6A–B illustrate one embodiment of a queued command conflict detection method 600 according to the present invention. As shown in FIG. 6A, after an entry point 601, in a procedure block 603, a host sends a command to a disk drive. Next, in a procedure block 605, the disk drive controller decodes the command. If, in a decision block 607, it is determined that the command is not a queued read or write, then queued command processing is finished at termination block 644. Otherwise, if the command is a queued read or write, then, in an alternative block 610, the controller reads the command tag value from the taskfile register. Next, block 612 uses the tag value as an index to check the valid flag of the corresponding indexed entry in the queued command RAM. If, in a decision block 614, the valid flag of the indexed entry is set, then, in block 616, a duplicate tag error interrupt is generated. Otherwise, if the valid flag is not set, then, in a decision block 620, it is determined if the command is a queued write. If the command is not a queued write, then, in a block 630, the new command is put into the queued command RAM at an entry corresponding to the index determined in block 612. Otherwise, as depicted in block 622, the command's LBA and block count are read from the taskfile register. The LBA and block count define an address range for the command. Following block 622, there is a check for an overlap 651 as described with respect to FIG. 6B, below. Following block 630, if, in a decision block 640, no conflict flags are determined to be on, then queued command processing is finished at termination block 644. Otherwise, in block 642, the conflict flag for the current command is set in the indexed entry of the queued command RAM. Also, a conflict error interrupt is generated to the microprocessor 410 (FIG. 4), which will restrict reordering based upon any set conflict flags, in order to prevent a conflict from occurring.

FIG. 6B illustrates an overlap check portion 650 of the queued command conflict detection method 600. After an entry point 651, in block 652, a first entry of the queued command RAM is selected. The first entry's LBA and count are read in block 654. If, in a decision block 656, the valid flag for the entry is not true, a jump is made to decision block 670. Otherwise, in a decision block 660, a determination is made if there is an address range overlap between the new command and the command represented by the selected entry.

Figure 1:
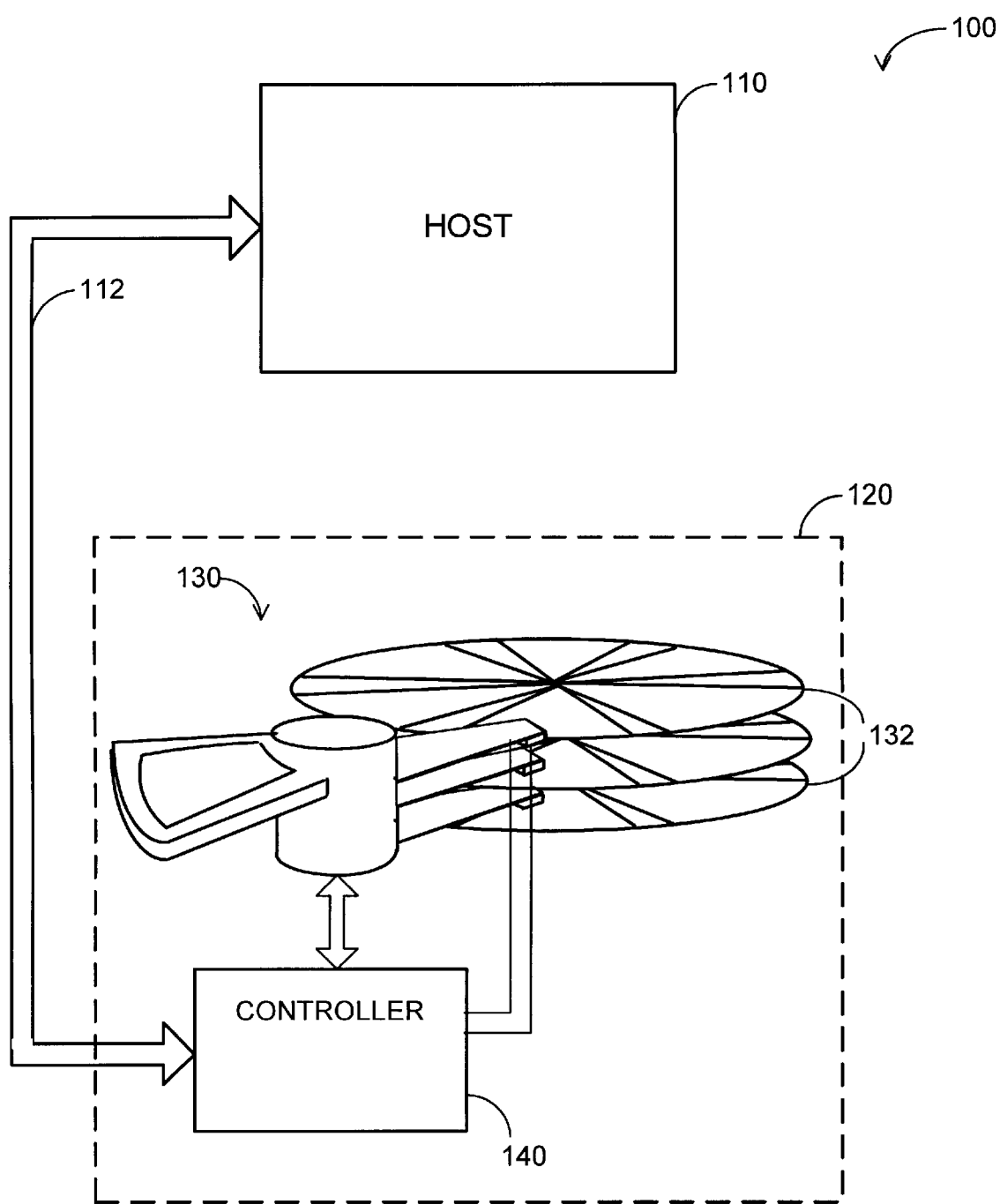
FIG. 1 is a top-level block diagram illustrating a conventional host and disk drive interface.
Figure 3A:
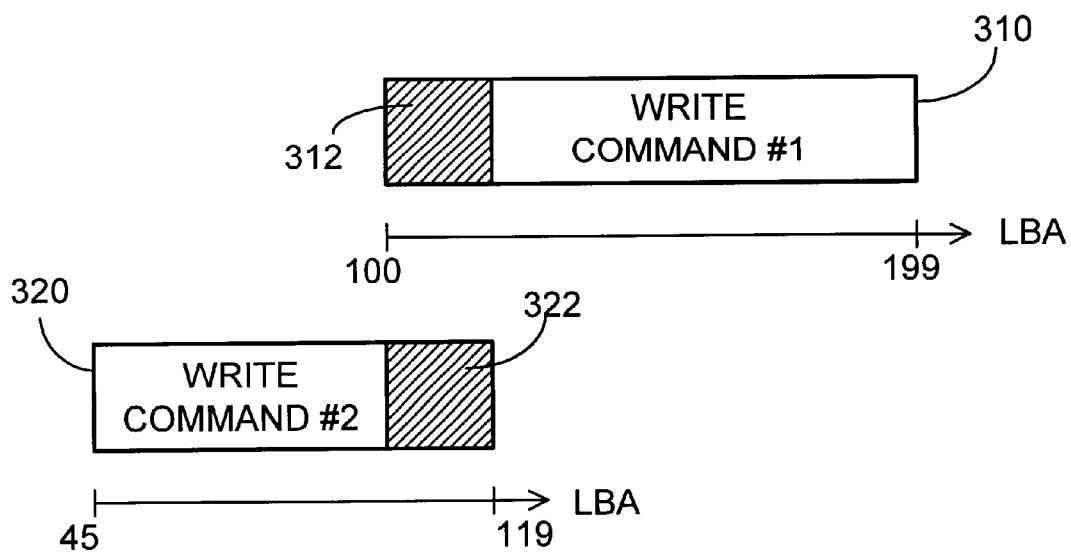
FIGS. 3A–B are diagrams illustrating queued command conflict scenarios.
Figure 3B:
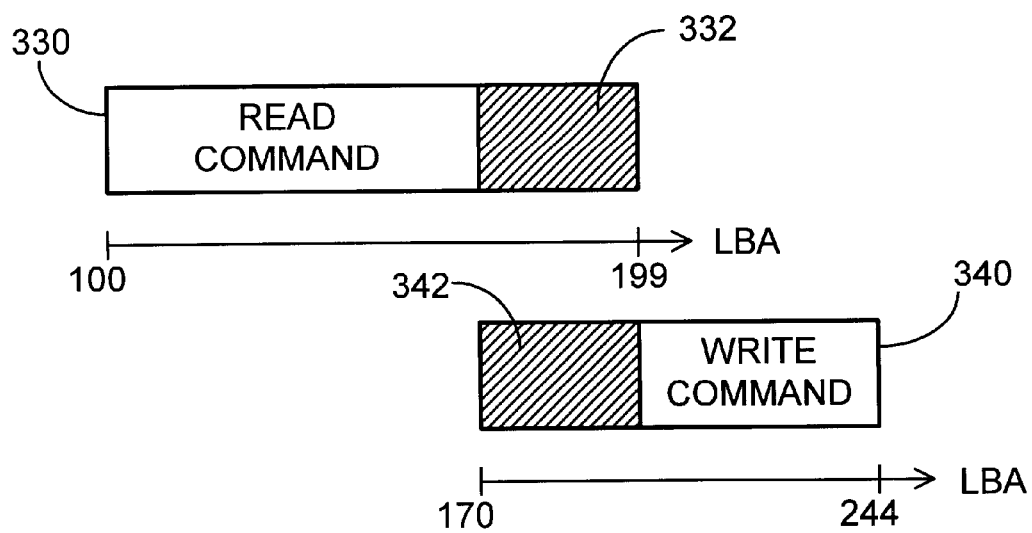

The address range overlap determination of block 660 is made according to the following equations:

$$(LBA_{new} \geq LBA_{entry}) \cdot [LBA_{new} < (LBA_{entry} + CNT_{entry})] \quad (1)$$

$$(LBA_{new} < LBA_{entry}) \cdot [(LBA_{new} + CNT_{new}) \geq LBA_{entry}] \quad (2)$$

where $LBA_{new}$ and $CNT_{new}$ are the LBA and block count, respectively, of the new command; and $LBA_{entry}$ and $CNT_{entry}$ are the LBA and block count, respectively, of the command represented by the selected entry. Equation (1) describes the situation where the new command has a higher or equal LBA than that of the entry command, such as depicted in FIG. 3B, above, assuming the entry command corresponds to command 330 (FIG. 3B) and the new command corresponds to command 340 (FIG. 3B). Equation (2) describes the situation where the new command has a lower LBA than that of the entry command, such as depicted in FIG. 3A, above, assuming the entry command corresponds to command 310 (FIG. 3A) and the new command corresponds to command 320 (FIG. 3A). If either equation (1) or equation (2) are true, then an address range overlap exists between the new command and the entry command.

Also shown in FIG. 6B, if there is not an address range overlap, then a jump is made to decision block 670.

Otherwise, in block 662, the conflict flag is set in the queued command RAM for the selected entry, based on the overlap. If, in decision block 670, all entries in the queued command RAM have been checked for an overlap with the current command, then, via a connector block 631, the current command is inserted into the queued command RAM at the indexed entry, as described with respect to block 630 (FIG. 6A), above. Otherwise, in block 672, the next entry in the queued command RAM is selected and that entry is compared for an overlap with the current command, according to blocks 654–662 as described above.

What is claimed is:

1. A conflict detection method for a disk drive controller, a conflict potentially occurring if the execution sequence of queued commands sent from a host is reordered to optimize disk drive data transfers, the method comprising the steps of:

decoding a first command, the first command being a queued read or a write;

reading a first logical block address (LBA) and a first block count associated with the first command, the first LBA and the first block count defining a first address range;

decoding a second command, the second command being a write;

reading a second LBA and a second block count associated with the second command, the second LBA and the second block count defining a second address range;

detecting an overlap between the first address range and the second address range;

setting a conflict flag based on the overlap; and restricting command reordering based upon the conflict flag in order to prevent the conflict from occurring.

2. The conflict detection method of claim 1 further comprising the steps of:

reading a tag value associated with the first command;

creating an entry in random access memory (RAM) according to the tag value; and storing the first LBA and the first block count in the entry, wherein the setting step comprises the substep of storing a set bit in the entry corresponding to the conflict flag.

3. The conflict detection method of claim 2 further comprising the steps of:

unloading the first command in chronological order from a first-in-first-out (FIFO) memory; and reading the set bit from the RAM entry, wherein the restricting step comprises the substep of processing the first command before any subsequent commands in the FIFO.

4. The conflict detection method of claim 1 further comprising the steps of:

reading a tag value associated with the second command;

creating an entry in random access memory (RAM) according to the tag value; and storing the second LBA and the second block count in the entry, wherein the setting step comprises the substep of storing the conflict flag in the entry.

5. The conflict detection method of claim 1 further comprising the steps of:

reading a tag value associated with the first command;

creating an entry in random access memory (RAM) according to the tag value; and storing the first LBA and the first block count in the entry, wherein the detecting step comprises the substeps of reading the first LBA and the first block count from the entry and comparing the first LBA and the first block count with the second LBA and the second block count.

6. The conflict detection method of claim 1 further comprising the steps of:

reading a first tag value associated with the first command;

creating an entry in random access memory (RAM) according to the tag value, the entry having a valid flag field;

reading a second tag value associated with the second command;

accessing the RAM according to the second tag value; and indicating an error if the accessing step reads the entry and the valid flag is set.

7. The conflict detection method of claim 1 further comprising the step of clearing the conflict flag upon completion of the first command.

8. A disk drive controller for processing host commands, each having an address range, which are received in a first order from a host and queued for subsequent execution, wherein the queued commands can be executed in a second order for improved latency, the disk drive controller comprising:

a command queue memory for storing a first one and a second one of the received host commands which are queued for execution, the second one of the host commands being a write command;

a scan engine, for scanning the command queue memory to detect an overlap between the address range of the first command and the address range of the second command;

a means, responsive to the scan engine scanning the command queue memory, for setting a conflict flag; and a means, responsive to the setting of the conflict flag, for modifying the second order of execution to avoid a conflict from the second command.

* * * * *